Patented Dec. 23, 1941

2,267,385

UNITED STATES PATENT OFFICE 2,267,385

MANUFACTURE OF INSECTICIDES

Homer E. Whitmire, Richmond Heights, Mo., assignor of forty-nine one-hundredths to Joseph E. Burger, Webster Groves, Mo.

No Drawing. Application April 18, 1936, Serial No. 75,229

8 Claims. (Cl. 167—24)

This invention relates generally to improved insecticides and the manufacture thereof, and particularly pertains to a stabilized rotenone insecticide.

Heretofore insecticides have been produced by extracting roots of various plants having insecticidal properties, such for instance as derris, cube, timbo, barbasco, etc. in which rotenone has been generally regarded as the active insecticidal principle. In the extraction of these roots it is the usual practice to reduce the root to a powder and thereafter treat this powder with a suitable solvent, such as carbon tetrachloride, so as to dissolve the organic matter. Upon distillation of this solution the residuum is in the form of a gummy mass which, depending upon the analysis of the root used as the raw material, may contain from 2 to 12% or even more rotenone.

From this residuum the chemically pure rotenone may be extracted and distributed for use either as a concentrate or in the form of crystals. Usually, however, when the insecticide is to be applied to plants, the rotenone is incorporated with a carrier, such as fuller's earth. In order to accomplish this the gummy residuum is frequently diluted with a suitable volatile solvent and the carrier impregnated with this solution to an extent such that it contains the desired amount of rotenone, as for instance, from ½ to 1% of the weight of fuller's earth after the solvent has evaporated. Of course, instead of using a solution of the gummy residuum the pure rotenone may be singly applied.

Rotenone is highly unstable and particularly so when in contact with fuller's earth, or similar materials, which may contain ingredients tending to oxidize the rotenone. For instance, certain fuller's earth impregnated with a solution containing 2% C. P. rotenone has been found, after an exposure to light for about six months in closed jars in a room, to have lost more than 75% of the original rotenone content.

The object of the present invention, generally stated, is to provide an improved insecticide from rotenone containing matter.

Another object of the present invention is to provide a stable or protected rotenone containing insecticide.

A further object of the present invention is to provide an insecticide capable of killing insects which alight upon a surface coated, painted or sprayed therewith.

Another object of the invention is to provide a process of making insecticides employing the extracts of rotenone containing matter which is more economical and convenient than those heretofore employed.

A further object of this invention is to provide an extract of rotenone containing matter which may be hardened and ground.

A more specific object of this invention is to recover from rotenone containing matter an insecticidal principle more toxic to insects than rotenone.

Further objects will become apparent to those skilled in the art when the following description is understood.

In accordance with the present invention, generally stated, the gummy residuum remaining after the distillation of an extract of rotenone containing matter is treated so as to recover therefrom an insecticidal principle more toxic than rotenone. In accomplishing this treatment in accordance with one embodiment of the present invention, the gummy residuum may be extracted with a suitable oil which is not a good solvent for rotenone, but is a solvent for a more toxic principle apparently associated with rotenone. The oil employed may also be one which, upon thorough incorporation tends to envelope the individual particles of rotenone and form a protecting film therearound. The presence of such a protecting film stabilizes or protects the rotenone and prevents oxidation thereof. Upon separation of the oil from the resinous matter as by filtration so that substantially all of the oil except a coating about each particle of rotenone is left with the resinous matter, the residue may be solidified or hardened to such an extent that it can be ground to a powder.

As an illustrative embodiment of the present invention rotenone containing roots, such as cube, derris, timbo, barbasco, cracca virginiana, etc., may be extracted in any desired manner as by first reducing the same to a powder and extracting the powder with a suitable solvent. A particularly good solvent is one containing a mixture of solvents having different boiling points such, for example, as 90% carbon tetrachloride, and 10% dichloro diethyl ether. Instead of carbon tetrachloride, other low boiling solvents, such as ethylene dichloride, trichlorethylene, acetone, etc., may be employed while other high boiling solvents, such as butyl ether, amyl ether, etc., may be substituted for the dichloro diethyl ether. While the relative proportions of the solvents will vary, enough of the high boiling solvent may be used so that some remains behind after complete evaporation of the low boiling solvent. The use of such mixtures including the high boiling solvents is advantageous in that charring or burning during distillation is prevented, especially if the temperature of distillation is determined in accordance with the low boiling solvent. The presence of such solvents in the residuum after distillation has a further advantage when the more toxic principle is to be recovered in accordance with the present invention, in that the resins and rotenone are prevented from sequestering the more toxic principle and hence the latter is available to the less potent solvents in the subsequent treatment.

Such a solvent or mixture of solvents may be percolated in the usual manner through the ground rotenone bearing root using, for instance 150–200 gallons of solvent for 300 pounds of root in order to accomplish the extraction. The resulting extract may then be distilled at a temperature about the boiling point of the low boiling solvent. The residuum remaining will be a gummy mass in which some of the high boiling solvent will be entrained. The residuum may contain from 2 to 12% or even more of rotenone, depending upon the rotenone content of the root extracted, associated with various gums and other ingredients, all of whose chemical characteristics are not ascertained.

This gummy residuum may now be incorporated with an oil, either mineral or vegetable, which is not a good solvent for rotenone, but which is capable of dissolving a more toxic principle from the residuum. The oil may also be one which will form a protective coating about the particles of rotenone, the presence of the small amount of residual solvent facilitating this action. Hydrocarbon oils, such as paraffin, kerosene, gasoline, benzene, etc., or vegetable oils, such as castor oil, soya bean oil, pine oil, cocoanut oil, etc., or mixtures thereof, may be used.

A convenient quantity of oil, such as 50 gallons to about 25 pounds of the gummy residuum may be thoroughly incorporated with the residuum. When the gummy residuum is first mixed with the oil and stirred the mixture becomes thin and the residuum seems to distribute itself with substantial uniformity throughout the oil. Upon continued agitation, kneading and maceration of the mixture, however, there is a gradual thickening until finally when the oil has been thoroughly incorporated with the residuum and in contact therewith for twenty minutes or more, a tacky menstruum begins to form in the mixture and separate from the excess oil. This menstruum may be kneaded so as to secure thorough incorporation of the oil and after the desired degree of tackiness is achieved, it may be removed from the excess oil and wrung to remove practically all of the oil.

For convenience this operation may be carried out at temperatures slightly above normal room temperature, as for instance 35° to 40° C. as at this temperature the materials are more workable and the menstruum is softer than at lower temperatures, although, of course, the operations may be carried out at room temperature.

If after the menstruum is removed from the oil and the excess oil pressed out, as described above, the temperature thereof is reduced to about 5° C., or therebelow, a hard friable resin results which may be broken, ground or pulverized with relative ease so as to produce an impalpable powder. If a substantial quantity of oil remains in the resin or the resin tends to be gummy for other reasons, a small amount of fuller's earth or other absorbent may be introduced to facilitate the grinding and prevent gumming of the machinery.

Upon completion of the grinding operation the resultant powders may be mixed with the desired amount of a suitable carrier, such as fuller's earth. As a practical example, based on pure total resin and rotenone content, 3 to 7 parts of the powder to 97 to 93 parts of fuller's earth, may be used thoroughly mixing the same together in the dry state. This provides an insecticide which may be dusted on plants when it is desired to destroy insects thereon, or dusted on animals to kill parasites.

The excess oil remaining after the menstruum has been removed therefrom may be filtered so as to remove all the entrained gum or rotenone, rotenone being substantially insoluble in the oil employed. This oil has apparently dissolved from the resins a very toxic insecticidal principle, several times more toxic, in fact, than rotenone itself. This oil may, therefore, be used as a spray insecticide or otherwise applied to animals or surfaces, as by painting, with the significant result that insects merely alighting upon it are affected and killed within a short time after the experience.

For a more specific illustration of one embodiment of the present invention, for instance twenty-five pounds of a gummy residuum of rotenone root extraction, containing about 20% crystalline rotenone may be treated with 50 gallons of kerosene oil. The gummy residuum may be thoroughly mixed with the oil at room temperature. Immediately after this incorporation a thin quasi solution will exist. Upon continued agitation, working or kneading, a gradual thickening and separation of menstruum from the oil will occur. This may require about thirty minutes. After the menstruum has separated the oil may be decanted and 50 gallons of fresh oil mixed with the menstruum. Agitation is then resumed in a vessel which may be conveniently heated so as to elevate the temperature to 55 to 65° C. Working at this temperature may continue for 15 minutes, after which the heating is discontinued and the mixture allowed to cool. Upon cooling the resinous particles are thrown down into a solid mass at the bottom of the vessel so that this oil may be decanted. The oil recovered from these operations, having dissolved a very toxic principle from the resins may be diluted with a convenient amount of suitable base or vehicle to form a spray, paint or lotion insecticide. For instance, the hundred gallons of oil used in the foregoing specific example may be diluted with 400 gallons of conventional spray base to make an insect spray which will kill insects by enveloping them in a mist of vapor. Moreover, such a mixture will kill insects, such as flies, which merely alight upon or walk over a surface painted, sprayed or coated with it in amounts of 0.1 c. c. or more to 10 sq. cm.

The toxic principle dissolved by the oils, as just described, may amount to approximately 0.125% of the finished spray, as just described, or 0.6% of the concentrate before dilution. While the chemical character of the principle is not ascertained with certainty upon vaporization of the oil, the residue is in the form of a waxy resin.

The resins recovered after the oil treatment, above described, are provided with a protecting film or envelope about the particles of rotenone therein, which film may be a result of partial or complete polymerization at the oil-rotenone interface. This would seem to be indicated by reason of the fact that continued extraction with carbon tetrachloride fails to remove all the rotenone from a given mass of the substance, and hence the rotenone is presented in a highly stable condition so that, when mixed with a suitable carrier, it acts as a highly efficient and substantially permanent insecticide.

From the foregoing description it is apparent that the present invention accomplishes its objects and a highly effective insecticide is provided in a more economical and convenient manner than has heretofore been possible. Since it is evident that many modifications and combinations of the composition and process herein described will present themselves to those skilled in the art without departing from the spirit of this invention; it is to be distinctly understood that the invention is not limited to the specific details as to composition and procedure which have been hereinbefore described, but that such modifications, combinations and sub-combinations and uses as do not depart from the spirit of this invention are, although not specifically described herein, contemplated by and within the scope of the appended claims.

Havng thus described the invention, what is claimed is:

1. In the art of making insecticides, the process comprising, extracting rotenone-containing roots with a solvent of the character of carbon tetrachloride, ethylene dichloride, trichlorethylene, ethers and the like which are solvents for rotenone, removing solvent from the extract to obtain a gummy residuum, working the residuum with an oil which is not a solvent for rotenone until the oil envelopes the particles of rotenone therein, and separating the excess oil.

2. In the art of making insecticides, the process comprising extracting rotenone-containing matter with a solvent of the character of carbon tetrachloride, ethylene dichloride, trichlorethylene, ethers and the like which are solvents for rotenone, distilling the extract to obtain a gummy residuum, working the residuum with an excess of hydrocarbon oil and separating the excess oil from the resinous matter.

3. In the art of making insecticides, the process comprising extracting rotenone-containing matter with a solvent of the character of carbon tetrachloride, ethylene dichloride, trichlorethylene, ethers, and the like which are solvents for rotenone, distilling the extract to obtain a gummy residuum, working the residuum with an excess of oil until a menstruum segregates, pressing the excess oil from the menstruum, permitting the menstruum to set, and grinding the resultant substance to a powder.

4. In the art of making insecticides, the process comprising, extracting rotenone-containing matter with a solvent of the character of carbon tetrachloride, ethylene dichloride, trichlorethylene, ethers, and the like which are solvents for rotenone, distilling the extract to obtain a gummy residuum, working the residuum with an excess of oil until a menstruum segregates, pressing the excess oil from the menstruum, permitting it to set and mixing the substance with a solid carrier.

5. In the art of making insecticides, the process comprising, extracting rotenone-containing matter with a solvent of the character of carbon tetrachloride, ethylene dichloride, trichlorethylene, ethers, and the like which are solvents for rotenone, distilling the extract to obtain a gummy residuum, working the residuum with an excess of oil which is substantially a non-solvent for rotenone, and recovering the excess oil.

6. In the art of making insecticides, the process comprising, extracting rotenone-containing matter with a solvent of the character of carbon tetrachloride, ethylene dichloride, trichlorethylene, ethers, and the like which are solvents for rotenone, distilling the extract to obtain a gummy residuum, and treating the residuum with oil, capable of dissolving an active insecticidal principle from the residuum but which is substantially a non-solvent for rotenone, and separating the oil from the insoluble components.

7. In the art of making insecticides, the process comprising, extracting rotenone-containing matter with a solvent of the character of carbon tetrachloride, ethylene dichloride, trichlorethylene, ethers, and the like which are solvents for rotenone, distilling the extract to obtain a gummy residuum, incorporating the residuum in a bath of oil which is a non-solvent for rotenone, agitating the mixture until a menstruum segregates, kneading the segregated menstruum in the oil, separating the excess oil, and permitting the segregated menstruum to set.

8. An insecticide comprising, the oil insoluble fraction of carbon tetrachloride-soluble components of rotenone containing vegetable matter, said insecticide being substantially devoid of oil soluble ingredients from the rotenone containing vegetable matter, the individual particles of rotenone being enveloped by an oil film.

HOMER E. WHITMIRE.